United States Patent
Saeki

[11] Patent Number: 5,228,183
[45] Date of Patent: Jul. 20, 1993

[54] ARRANGEMENT AND METHOD FOR SECURING HEADREST STAY IN SEAT

[75] Inventor: Hiroshi Saeki, Akishima, Japan
[73] Assignee: Tachi-S. Co., Ltd., Akishima, Japan
[21] Appl. No.: 686,160
[22] Filed: Apr. 16, 1991
[51] Int. Cl.$^5$ .................. B29C 39/00; B60N 2/00
[52] U.S. Cl. .................. 29/527.3; 29/91.1; 29/450; 297/410
[58] Field of Search .................. 29/91, 91.1, 450, 530, 29/527.1, 527.2, 527.3; 297/391, 396, 404, 410; 264/46.4, 46.6, 46.8

[56] References Cited

U.S. PATENT DOCUMENTS

| | | | |
|---|---|---|---|
| 4,527,834 | 7/1985 | Zyngier | 297/391 X |
| 4,679,850 | 7/1987 | Bianchi et al. | 297/410 |
| 5,107,576 | 4/1992 | Rohn | 29/91.1 |

FOREIGN PATENT DOCUMENTS

| | | |
|---|---|---|
| 2131956 | 12/1972 | Fed. Rep. of Germany . |
| 2332610 | 6/1973 | Fed. Rep. of Germany . |
| 3422697 | 12/1985 | Fed. Rep. of Germany . |
| 2-19347 | 2/1990 | Japan . |
| 2082053 | 3/1982 | United Kingdom . |

Primary Examiner—Mark Rosenbaum
Assistant Examiner—S. Thomas Hughes
Attorney, Agent, or Firm—Oldham, Oldham & Wilson Co.

[57] ABSTRACT

An arrangement and method for securing a headrest stay in a seat, wherein a seat back frame with a staty holder is placed in a mold, the stay holder having an aperture formed therein, a core die having a thin portion is inserted in the stay holder, and then a base foamable material is injected in the mold, for carrying out a foaming. The base material liquid is flowed through the aperture into the stay holder, and as a result of the foaming, there is formed a cushiony part in the stay holder, which acts as a detent for preventing a headrest stay, when inserted in the stay holder, against horizontal and vertical movement or wobbling in the holder.

7 Claims, 2 Drawing Sheets

ARRANGEMENT AND METHOD FOR SECURING HEADREST STAY IN SEAT

BACKGROUND OF THE INVENTION

1. Field of the Invention

The present relates to a headrest provided on an automotive seat, and particularly to an arrangement and method for securing a headrest stay in the seat.

2. Description of Prior Art

In an integral foamed seat back construction, it has been common to use a cylindrical die to form a pair of holes for receiving a pair of headrest stay dependent from a headrest body. In this seat back forming process, a seat back frame having a pair of headrest stay holders provided on its upper frame section is placed in a mold, then two cylindrical dies are fully inserted in such pair of headrest stay holders, respectively, down to the lower ends of the headrest stay holders, after which, a foamble base material in liquid form is injected into the mold to carry out a foaming together with the seat back frame, and after the foaming step, the two cylindrical dies are taken out from the respective headrest stay holders. Thus, an integral seat back body with opened pair of headrest stay holders is obtained, which allows insertion of the two headrest stays into the respective stay holders.

This kind of seat back is shown in FIG. 1, as designated by (SB). The seat back (SB) is formed in the above-described foaming way into an integral body comprising a foam cushion member (1), a seat back frame (2) embedded in the cushion member (1), a pair of spaced-apart headrest stay holders (3)(3) fixed on the upper frame section of seat back frame (2), and a covering member (8) affixed over the cushion member (1). A headrest (HR) is provided upon the seat back (SB) such that a pair of spaced-apart headrest stays (5)(5) dependent from the headrest (HR) are inserted into the foregoing pair of headrest stay holders (3)(3), as shown.

However, if a strict tolerance is set between the spacing (L1) of the two headrest stays (5)(5) and that (L2) of the stay holders (3)(3), the stays (5)(5) will not easily be inserted into the holders (3)(3), or alternatively if a rough design is made in this regard, the stays (5)(5) will not be fit settled in the holders (3)(3), resulting in wobbling of the stays (5)(5) and thus of the headrest (HR).

To solve such problem, the Japanese Utility Model Publication No. 2-19347 suggests provision of a leaf spring in each of headrest stay holders. The leaf spring resiliently bias a heardrest stay into contact with the inner surface of the stay holder, thereby compensating for a play created between the headrest stay and stay holder and eliminating the wobbling of the stay in the holder. But, this arrangement is rather complicated, and the leaf spring is hard to be mounted in the stay holder, requiring a certain expertise or troublesome steps for assemblate of the seat.

SUMMARY OF THE INVENTION

In view of the above shortcomings, it is a purpose of the present invention to provide an improved arrangement for securing a headrest stay in a seat, which is simple in structure and permits use of the foregoing conventional headrest stay and holder without additional elements and mechanisms.

In achieving such purpose, according to the invention, employing such integral foam cushion structure of seat back as described in the prior art description above, which comprises a cushion member and a seat back frame embedded therein, the frame having a headrest stay holder fixed thereon, there is formed a detent portion in the stay holder, which is a part of the foam cushion member within the stay holder to resiliently retain the headrest stay against horizontal movement in a direction intersecting a vertical axis of the stay holder as well as against vertical movement along a vertical axial direction of the holder. Such detent part of the cushion member located in the stay holder is formed by invading or flowing a foamable base material into inner bore of the holder during a foaming process. For that purpose, the stay holder is formed with an injection apperture through which the base material is flowed into the inner bore of the holder.

In the foaming process, when the seat frame with the stay holder is placed in the mold, a core die having a thin portion is inserted in the stay holder, and then the foamable base material is injected into the mold, in order that the base material is flowed through the foregoing injection aperture into the stay holder. Thus, in the holder, the above-mentioned detent part is formed.

Accordingly, a part of the cushion member is utilized for retaining the headrest stay in the stay holder, without any other complicated elements and steps. The construction is much simplified, and the headrest can be easily retained against wobbling.

DETAILED DESCRIPTION OF PREFERRED EMBODIMENT OF THE INVENTION

Figure 1:
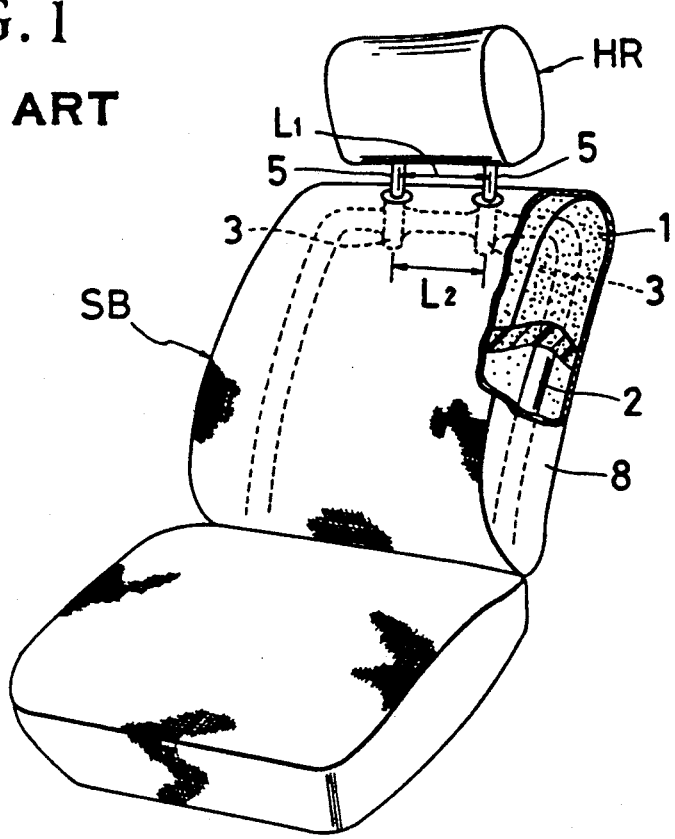
FIG. 1 is a partly broken perspective view of a seat having a coventional headrest stay securing arrangement.
Figure 2:
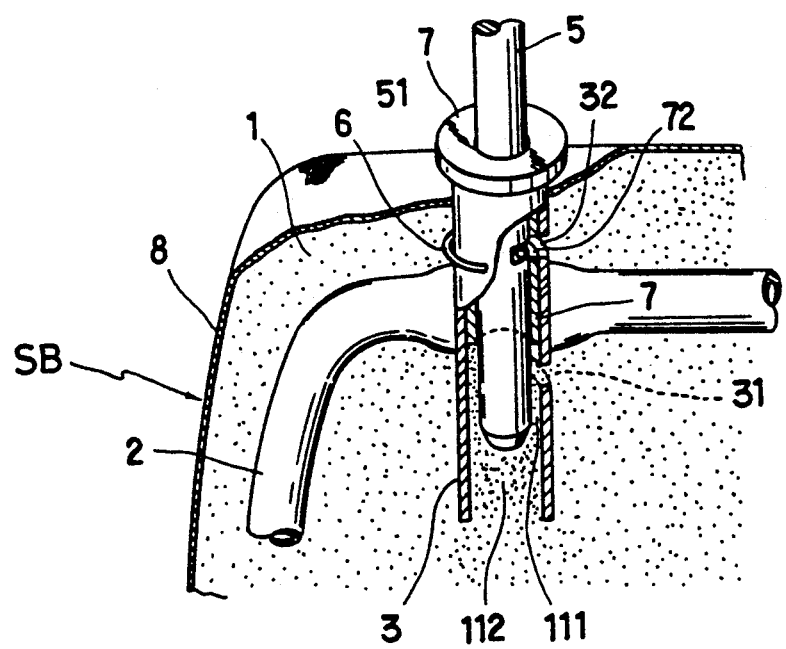
FIG. 2 is a partly cut-away, partial perspective view showing a principal part of headrest stay securing arrangement in accordance with the present invention.

Referring to FIG. 2, there is illustrated an arrangement in accordance with the present invention, wherein a headrest stay is secured in a seat back.

First of all, the present invention is directed to an improvement based upon the previously stated prior-art headrest structure using an integral seat back body (SB) having the seat back frame (2) and two stay holders (3)(3), together with the headrest (HR) having the two stays (5)(5). Therefore, no specific description is made thereon, and it should be understood that all like designations to be used hereinafter corresponds to all like ones given in the prior art description above.

Each of the two stay holders (3)(3) is formed with a securing slit (32) in which the snap ring (6) is fitted for the purpose of securing the headrest stay (5) against removal from the holder (3). Designation (7) denotes a cylindrical stay guide member fitted in the stay holder (3), the guide member (7) being also formed with a securing slit (72) disposed in alignment with the securing slit (32). As shown, the snap ring (6) is fitted through those two slits (32)(72) to a securing notch formed in the stay (5). Such ring snap securing structure is known, and other suitable securing structure may be used.

However, according to the present invention, there is formed an injection aperture (31) in the surface of the lower part of the stay holder (3) for a purpose to be set forth later.

As designated by numerals (111)(112), within the lower bore portion of the stay holder (3), the part of cushion member (1) corresponding thereto is in the state of being pressed with a density increased, as illustrated. The lower end portion of the headrest stay (4) is embraced resiliently in such part of cushion member (1). As will be explained later, during forming process, a foamable base material in liquid form is invaded and flowed through the injection apperture (31) into the lower inner bore part of stay holder (3), creating an annular foam cushiony area (111) and bottom foam cushiony area (112) (see FIG. 4). Hence, the lower end part of the headrest stay (5) is inserted in the annular area (111) and resiliently received at the bottom area (112), with the result that the resilient repercussive property of those areas (111)(112) gives an embracing support force to the corresponding lateral surface of the headrest stay (5) as well as an upwardly biasing force to the end of the same stay (5). For this reason, the annular cushiony area (111) constitutes a detent part for preventing the stay (5) against horizontal movement in a direction intersecting a vertical axis passing through the stay holder (3), whereas on the other hand, the bottom cushiony area (112) constitutes a detent part for preventing the stay (5) against vertical movement along the vertical axis of the stay holder (3) in cooperation with the snap ring (6). The headrest stay (5) is therefore retained still by virtue of such two detent effects, thereby being prevented against movement or wobbling within the stay holder (3).

Figure 3:
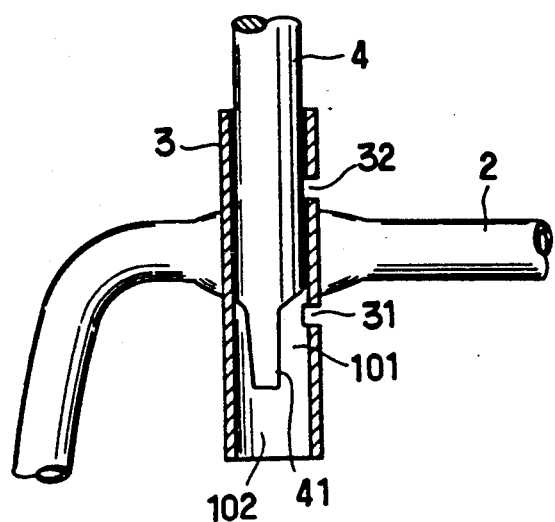
FIG. 3 is a partly sectional, front view of a seat back frame and stay holder of the arrangement as in the FIG. 2, showing the state where a core die is inserted the stay holder during a foaming process.
Figure 4:
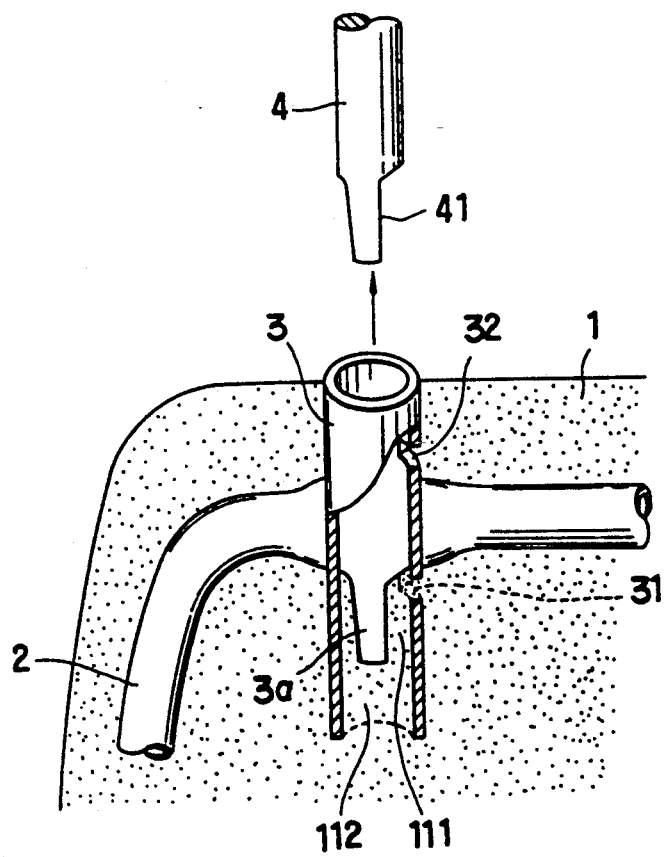
FIG. 4 is a schematic, partly broken, perspective view showing a state where the foaming process as in the FIG. 3 is completed and the core die is removed from the stay holder.

FIGS. 3 and 4 illustrates a forming process for achieving the above-described headrest stay securing arrangement. Substantially, the forming steps are similar to those as stated in the prior description above, but according to the present invention, a tapered type of core die (4) is utilized for forming the foregoing annular and bottom cushiony areas (111) (112). The core die (4) has a thin portion (41) which is formed by cutting away the peripheral surfaces at the lower part of the die (4) in respect to the central axis thereof. The formation of such thin portion (41) may be effected in any other desired way, insofar as it is of a dimension enough to create a recessed part (3a) in the stay holder (3) (see FIG. 4) which allows the lower end of the headrest stay (5) to be inserted into that recessed part (3a). For example, plural groove stripes may be formed at the thin portion (41) of core die (4).

The core die (4) is inserted into the stay holder (3) in order that the shoulder (4a) of the die (4) is located immediately above the injection aperture (31) of stay holder (3), as shown in FIG. 3. For that purpose, the thin portion (41) of die (4) should be formed at such a length that, when inserted in the holder (3), the thin portion (41) extends generally from a level flush with the aperture (31) down to a midway between the apertures (31) and the lower end of the holder (3), such that an annular hollow region (101) is defined between the thin portion (41) and the inner wall of the holder (3), and further a lower hollow region (102) is defined below the lower end of the thin portion (41) within the lower end part of the holder (3).

With the core die (4) inserted in the stay holder (3) as above, the seat back frame (2), of course along with such stay holder (3), is placed in a mold (not shown) and then a foamable base material in liquid form is injected into the mold. The base material liquid is invaded or injected through the injection aperture (31) as well as through the lower end opening of the holder (3) into those annular and lower hollow regions (101)(102) of the same. This is understandable from FIGS. 3 and 4.

Then, a foaming is effected to foam and cure the base material liquid, and as a result, an integral seat back body composed of foam cushion member (1) and seat frame (2) with stay holder (3) is produced. After removing the core die (4) from the holder (3), and taking out the resultant seat back body, such stay holder structure as shown in FIG. 4 is obtained, wherein a securing bore (3a) is defined in the annular and bottom cushiony areas (111)(112).

It is noted that the above-stated arrangement is made to both pair of stay holders (3)(3), while the descriptions above are made of only one of them.

Next, the headrest stay (5) of headrest (HR) is inserted into the holder (3) and fitted in the foregoing securing bore (3a) therein as depicted in FIG. 2.

As described above, it is to be appreciated that a detent part (i.e. 111, 112) can easily be formed in the respective stay holders (3)(3) by simply subjecting the holders to a foaming process using the core die (4), and therefore, the conventional stay holders can be dealt with in the present invention without any separate or complicated fittings or device.

Moreover, the annular cushiony area (111) serves not only to keep away the stay (5) from contact with the inner wall of the stay holder (3), thus suppressing an unpleasant contact noise, but also to provide a flexible tolerance for allowing the headrest stays into the stay holders, both of them being slightly different from each other in terms of spacing. This makes much easier the assemlage of the headrest upon the seat back.

Finally, the present invention is not limited to the embodiment shwon, and any other modifications, additions, or replacements may structurally be possible without departing from the scopes and spirit of the appended claims.

What is claimed is:

1. An arrangement for securing a headrest stay in a seat, wherein said seat includes a seat back, wherein said seat back is formed from an integral foam cushion body having, embedded integrally therein, a seat back frame with a cylindrical headrest stay holder fixed thereon, said headrest stay holder being opened in said seat back, and wherein a stay of a headrest body is inserted and secured in said stay holder, said arrangement comprising:

a means for allowing flow of a foamable base material in liquid form into an inner bore of said stay holder, said foamable base material being subjected to a foaming process to comprise said integral foam cushion body;

said means being provided in said stay holder; and a part of said foam cushion body within said stay holder, wherein said headrest stay is inserted in said stay holder and resliently retained by said part of said foam cushion body against movement.

2. The arrangement as defined in claim 1, wherein said part of said foam cushion body is so formed as to be deformable for embracingly receiving a lower end part of said headrest stay, when said headrest stay is inserted and secured in said stay holder, whereby said headrest stay lower end part is given a repercussive force circumferentially thereof as well as at a lower end thereof, from said part of said foam cushion body.

3. The arrangement as defined in claim 2, wherein said part of said foam cushion body is formed with an annular cushiony area and a bottom cushiony area, within a lower end part of said stay holder, said annular and bottom cushiony areas forming a recessed opening therein, and wherein, when said headrest stay is inserted in said stay holder, the lower end part of said stay is fitted in said recessed opening of said cushion body part, whereby said annular cushiony area is interposed between an inner surface of said stay holder and an outer surface of said headrest stay, thereby constituting a detent for preventing said headrest stay against horizontal movement or wobbling relative to a vertical axis of said stay holder, whereas said bottom cushiony area receives resiliently the lower end of said headrest stay, thereby constituting a detent for preventing said headrest stay against vertical movement or wobbling along a vertical longitudinal direction of said stay holder.

4. The arrangement as defined in claim 3, wherein said stay holder is provided with a means for locking said headrest stay to said holder, and wherein said bottom cushiony area of said foam cushion body part within said stay holder cooperates with said locking means to positively retain said headrest stay against vertical movement or wobbling along the vertical longitudinal direction of said stay holder.

5. The arrangement as defined in claim 1, wherein said means comprises an injection aperture formed in a lower part of said stay holder.

6. A method of securing a headrest stay in a seat, in which said seat includes a seat back, comprising the steps of:
   placing a seat back frame with a cylindrical stay holder fixed thereon, in a mold,
   said stay holder having an injection aperture formed therein;
   inserting into said stay holder a core die of cylindrical form which is at its lower end part formed with a thin portion, such that said core die body is stopped above said injection aperture, except for said thin portion of said core die;
   injecting a foamable base material into said mold, in order that said material is also flowed through said injection aperture into an inner bore of said stay holder;
   effecting a foaming of said base material into a foam seat back cushion body together with said seat back frame integrally, and
   thereafter, removing said core die from said stay holder, and taking out a resultant said seat back cushion body from said molding,
   wherein a part of said cushion body, where it is within said stay holder, is formed into an annular cushiony area and a bottom cushiony area,
   then, inserting a headrest stay depending from a headrest body into said stay holder, such that a lower end part of said headrest stay is resiliently embracingly received in said annular and bottom cushiony areas,
   whereby said headrest stay lower end part is retained by said annular cushiony area against horizontal movement in a direction intersecting a vertical axis of said stay holder and also by said bottom cushiony area against vertical movement along a vertical axial direction of said stay holder.

7. The method as defined in claim 6, wherein said thin portion of said core die has a tapered shape.

* * * * *